(12) United States Patent
Xiao et al.

(10) Patent No.: US 7,804,447 B2
(45) Date of Patent: Sep. 28, 2010

(54) METHOD FOR DETERMINING POSITIONS OF CONTACTS

(75) Inventors: Yong-Hui Xiao, Shenzhen (CN); Li-Rong Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 80 days.

(21) Appl. No.: 12/241,598

(22) Filed: Sep. 30, 2008

(65) Prior Publication Data

US 2009/0284412 A1 Nov. 19, 2009

(30) Foreign Application Priority Data

May 19, 2008 (CN) .......................... 2008 1 0301647

(51) Int. Cl.
*G01S 19/42* (2010.01)
*G01C 21/00* (2006.01)

(52) U.S. Cl. .................................. 342/357.25; 701/213
(58) Field of Classification Search ............ 342/357.06, 342/357.08, 357.12, 357.13, 357.15; 701/213, 701/215
See application file for complete search history.

(56) References Cited

U.S. PATENT DOCUMENTS

2005/0080786 A1* 4/2005 Fish et al. ..................... 707/10
2009/0222482 A1* 9/2009 Klassen et al. ........... 707/104.1

\* cited by examiner

*Primary Examiner*—Dao L Phan
(74) *Attorney, Agent, or Firm*—Clifford O. Chi

(57) ABSTRACT

A method for determining the positions of contacts through a global positioning system (GPS) is disclosed. The method includes sending position requests to the contacts, feeding back the current position information of the contacts to a GPS receiver of a user after receiving position requests, searching the contacts located within a same geographical region as the user according to the feedback information and displaying a list of the contacts to the user in the same geographical region.

6 Claims, 3 Drawing Sheets

METHOD FOR DETERMINING POSITIONS OF CONTACTS

BACKGROUND

1. Technical Field

The present invention relates to a method for determining the positions of contacts through a global positioning system.

2. Description of Related Art

A GPS (Global Positioning System) receiver calculates its position by carefully timing the signals sent by the constellation of GPS satellites high above the Earth. Each satellite continually transmits messages containing the time the message was sent, a precise orbit for the satellite sending the message, and the general system health and rough orbits of all GPS satellites. These signals travel at approximately the speed of light. The receiver uses the arrival time of each message to measure the distance to each satellite, from which it determines the position of the receiver. The resulting coordinates are converted to more user-friendly forms such as latitude and longitude, or location on a map, which are then displayed to the user.

There is however, room for improvement within the art.

DETAILED DESCRIPTION OF EMBODIMENTS

Figure 1:
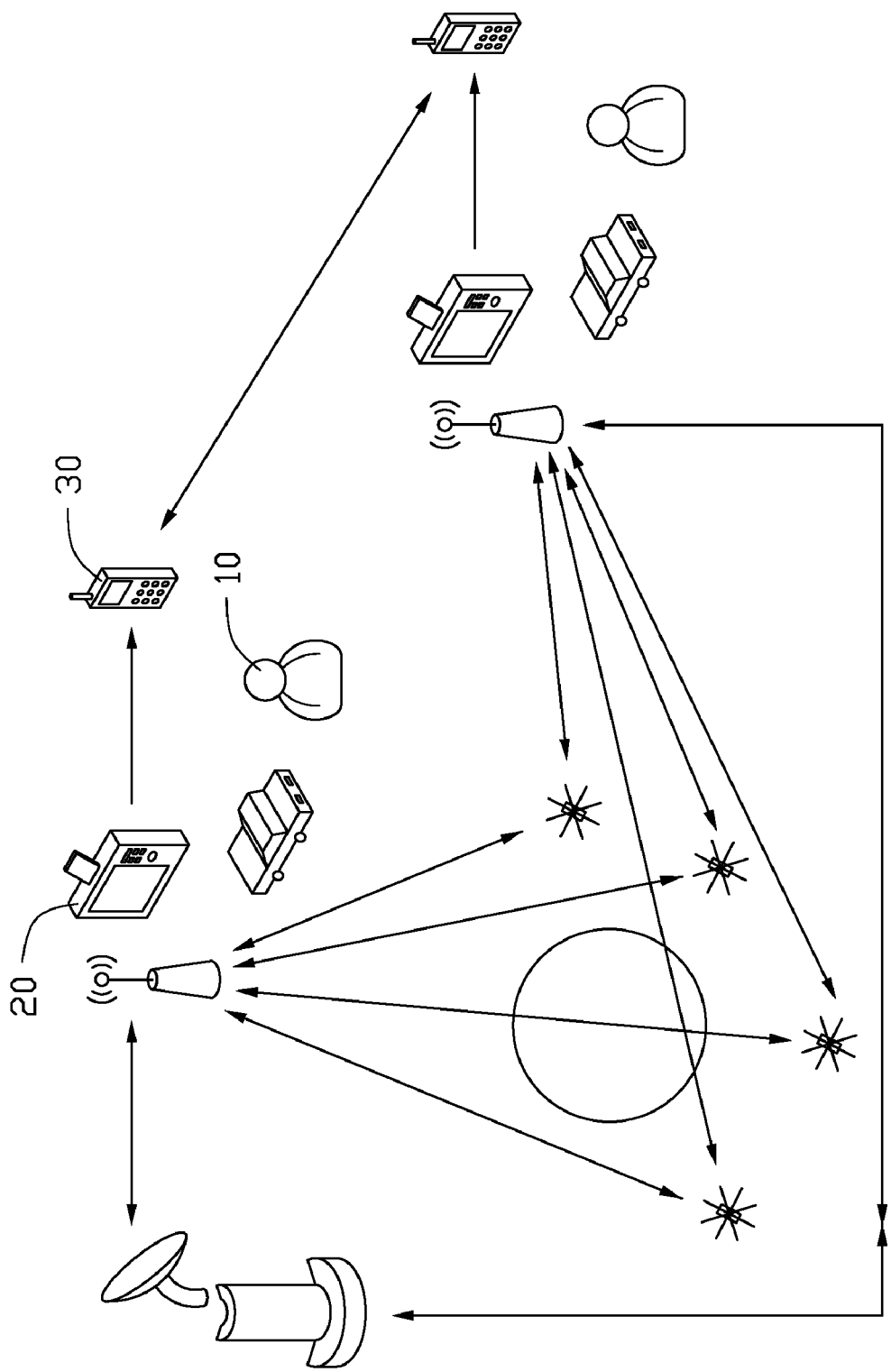
FIG. 1 is a schematic representation of an embodiment of a method for determining positions of contacts.

FIG. 1 is a schematic representation of an embodiment of a method for determining the positions of user contacts through GPS. The view shows a user 10 having a car with a GPS receiver 20 communicating with a phone 30 of the user via Bluetooth® for example.

Figure 2:
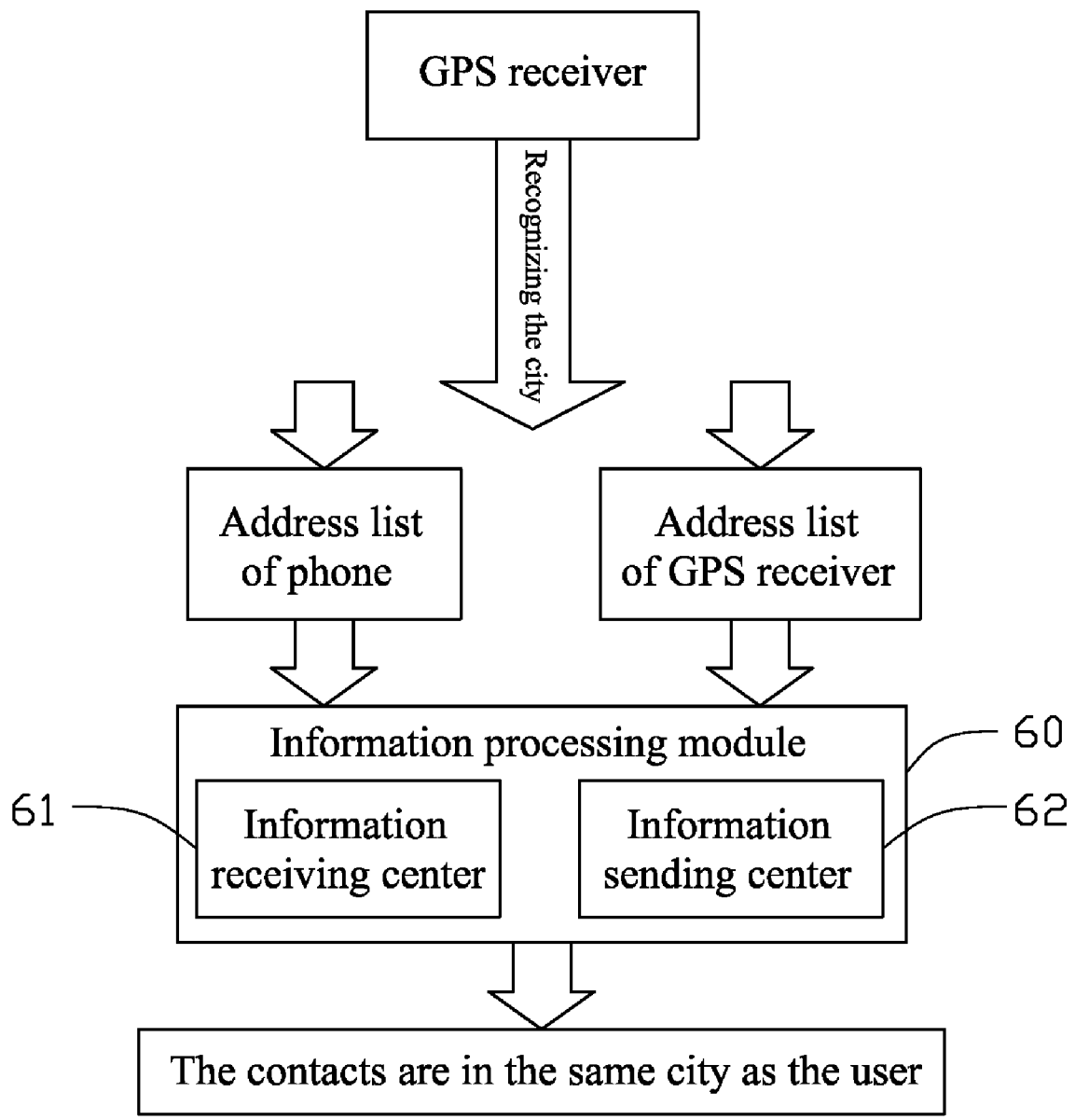
FIG. 2 is a block diagram of the method for determining the positions of contacts.

FIG. 2 illustrates a block diagram of the method for determining the positions of user contacts. For example, when the user 10 arrives at a geographical region, such as a city, the GPS receiver 20 recognizes the geographical region. The GPS receiver includes an information processing module. The information processing module 60 includes an information receiving center 61 and an information sending center 62. The information receiving center 61 receives requests from other GPS receivers through a network such as the 3 G network or by short messages from phones. The information receiving center 61 returns position information of the user 10 to the requesting GPS receivers through the network such as the 3 G network or by reply short message.

The information sending center 62 sends position requests to contacts found in address lists of the phone 30 and the GPS receiver 20 when the user 10 arrives at the geographical region. The information sending center 62 receives information on current locations of the contacts and finds the locations of the contacts in the same geographical region as the user 10. The information sending center 62 of the GPS receiver 20 displays detailed information of the contacts to the user 10, for example, a name and a telephone number of each contact. The user 10 can elect to communicate with the contacts in the same geographical region through the network or by the short message.

Figure 3:
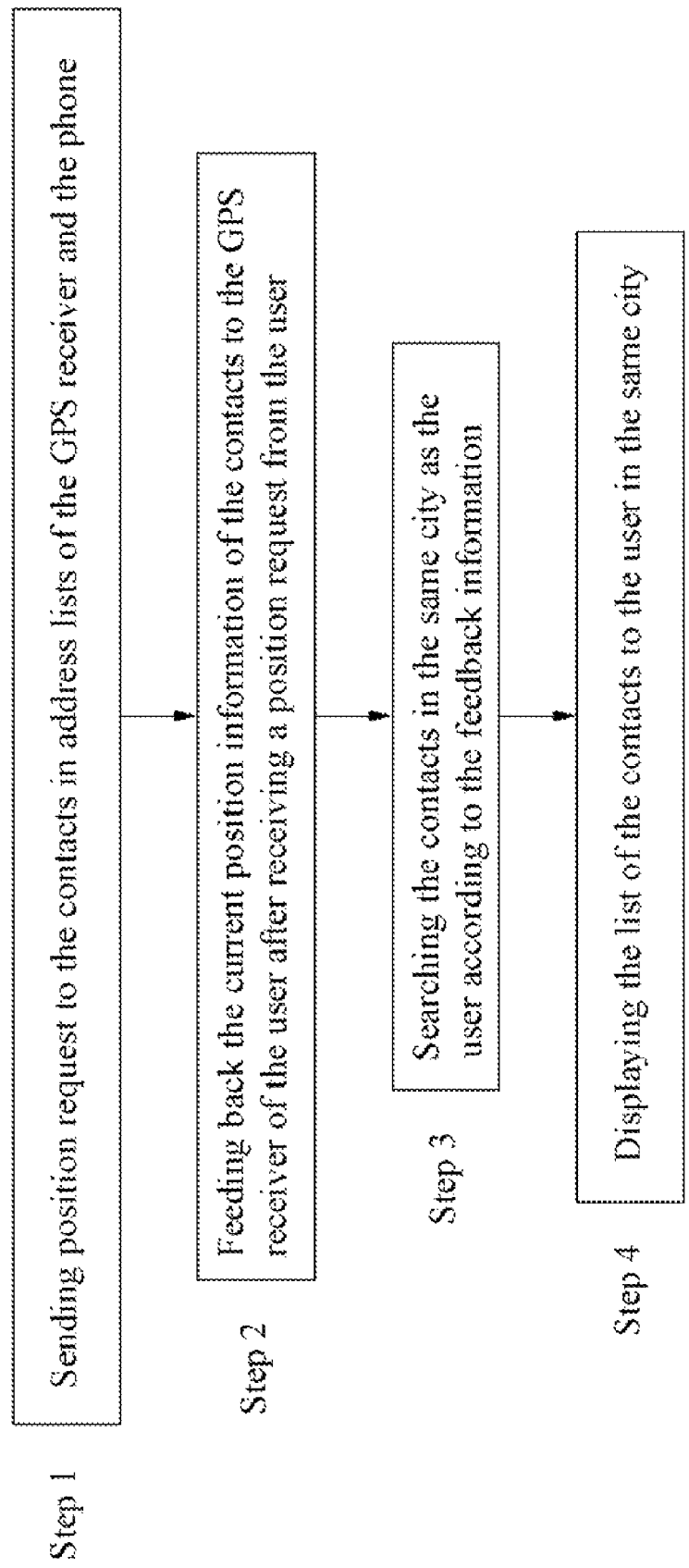
FIG. 3 is a flow chart of the method in FIG. 2.

FIG. 3 illustrates a flow chart of the method of determining the positions of contacts. Depending on the embodiment, certain steps described below may be removed, while others may be added, and the sequence of steps may be altered as well. The method includes the following steps:

Step 1: sending position requests to the contacts in address lists of the GPS receiver 20 and the phone 30 through the 3 G network or by the short message of the phone 30.

Step 2: feeding back the current position information of the contacts to the GPS receiver 20 of the user 10 after receiving a position request from the user 10.

Step 3: searching for the contacts in the same geographical region as the user 10 according to the feedback information.

Step 4: displaying the list of the contacts to the user 10 in the same geographical region; allowing the user 10 to elect to communicate with the contacts through 3 G network or short messages of the phone 30.

It is to be understood, however, that even though numerous characteristics and advantages of the present embodiments have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A method for determining the positions of contacts through a global positioning system (GPS), the method comprising:

sending position requests to the contacts;

feeding back current position information of the contacts to a GPS receiver of a user after receiving position requests;

searching the contacts located within a same geographical region as the user according to the feedback information; and displaying a list of the contacts to the user in the same geographical region.

2. The method of claim 1, wherein sending position requests to the contacts is through a 3 G network.

3. The method of claim 1, wherein sending position requests to the contacts is through a short message in a phone.

4. The method of claim 1, further comprising electing to communicate with the contacts in the same geographical region.

5. The method of claim 1, wherein position requests sent to the contacts comprises contacts in address lists of the user.

6. The method of claim 5, wherein the address lists of the user comprise an address list of the GPS receiver and an address list of a phone.

* * * * *